(12) United States Patent
Doornekamp et al.

(10) Patent No.: US 10,490,788 B2
(45) Date of Patent: Nov. 26, 2019

(54) BATTERY ASSEMBLY AND METHOD OF MANUFACTURING THE SAME

(71) Applicant: SUPER B B.V., Hengelo (Ov) (NL)

(72) Inventors: Marinus Hendrikus Doornekamp, Amersfoort (NL); Marten Johan Zilvold, Vorden (NL)

(73) Assignee: SUPER B B.V., Hengelo (OV) (NL)

(*) Notice: Subject to any disclaimer, the term of this patent is extended or adjusted under 35 U.S.C. 154(b) by 719 days.

(21) Appl. No.: 14/892,681

(22) PCT Filed: May 24, 2013

(86) PCT No.: PCT/NL2013/050379
§ 371 (c)(1),
(2) Date: Nov. 20, 2015

(87) PCT Pub. No.: WO2014/189362
PCT Pub. Date: Nov. 27, 2014

(65) Prior Publication Data
US 2016/0111694 A1 Apr. 21, 2016

(51) Int. Cl.
*H01M 2/10* (2006.01)
*H01M 2/20* (2006.01)

(52) U.S. Cl.
CPC ......... *H01M 2/1077* (2013.01); *H01M 2/206* (2013.01); *H01M 2220/20* (2013.01)

(58) Field of Classification Search
CPC .................................................. H01M 2/206
See application file for complete search history.

(56) References Cited

U.S. PATENT DOCUMENTS

| 5,004,081 A | 4/1991 | Custer | |
| 2003/0193313 A1* | 10/2003 | Takedomi | H01M 2/1077 320/107 |
| 2011/0008659 A1* | 1/2011 | Okada | H01M 2/1077 429/90 |
| 2011/0104532 A1 | 5/2011 | Buck et al. | |
| 2011/0262797 A1* | 10/2011 | Kim | H01M 2/1077 429/149 |
| 2011/0287299 A1* | 11/2011 | Kim | H01M 2/1077 429/158 |

(Continued)

FOREIGN PATENT DOCUMENTS

| DE | 10 2011 075677 A1 | 11/2012 |
| WO | 80/01896 A1 | 9/1980 |

(Continued)

OTHER PUBLICATIONS

Machine translation of WO 2011/149234 A (Year: 2011).*
International Search Report, dated Jan. 27, 2014, from corresponding PCT application.

*Primary Examiner* — Robert S Carrico
(74) *Attorney, Agent, or Firm* — Young & Thompson

(57) ABSTRACT

Battery assembly, comprising a primary positive battery terminal (20) and a primary negative battery terminal (22) connected by an electrical circuit, the electrical circuit comprising a series or parallel connection of one or more battery cells (14). The battery assembly (1) further comprises an external skeleton formed by an internal base plate (16), an internal top plate (18) and a plurality of cell brackets (24), surrounding the one or more battery cells (14).

17 Claims, 5 Drawing Sheets

(56) References Cited

U.S. PATENT DOCUMENTS

Figure 1:
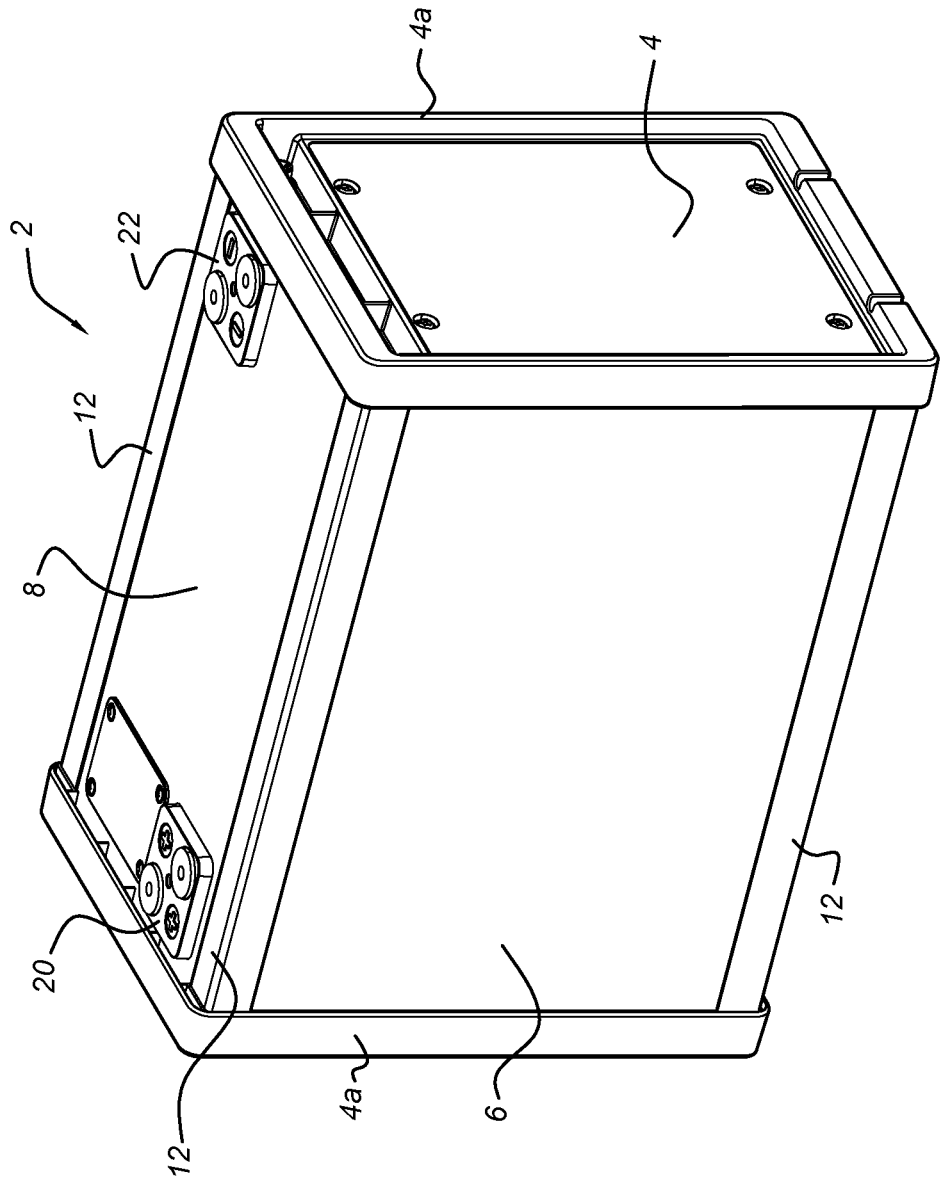

| | | | | |
|---|---|---|---|---|
| 2012/0045686 A1* | 2/2012 | Jung | ............... | H01M 2/10 429/159 |
| 2012/0094164 A1* | 4/2012 | Wuensche | ........... | H01M 2/1061 429/100 |
| 2014/0017536 A1* | 1/2014 | Lu | ............... | H01M 2/0267 429/99 |
| 2014/0038030 A1* | 2/2014 | Goesmann | .......... | H01M 2/1072 429/157 |

FOREIGN PATENT DOCUMENTS

| | | | | |
|---|---|---|---|---|
| WO | 2011/149234 A2 | 12/2011 | | |
| WO | WO-2012163460 A1 * | 12/2012 | .......... | H01M 2/1072 |

* cited by examiner

BATTERY ASSEMBLY AND METHOD OF MANUFACTURING THE SAME

FIELD OF THE INVENTION

The present invention relates to a battery assembly comprising a minimum number of components for providing structural integrity and rigidity to the battery assembly. According to a further aspect, the present invention relates to a method of assembling the battery assembly.

PRIOR ART

US Patent publication US 2011/0104532 discloses a battery pack assembly for automotive applications, with pressure release features and a plurality of battery cells. The battery pack assembly comprises a container housing a plurality of battery modules, wherein the housing has a base and a plurality of side walls. A pressure release device is present in the support tray.

SUMMARY OF THE INVENTION

The present invention seeks to provide a battery assembly comprising a minimum number of modular components for providing structural integrity to the battery assembly. According to the invention, a battery assembly according to the preamble is provided, comprising a primary positive battery terminal and a primary negative battery terminal connected by an electrical circuit, the electrical circuit comprising a series or parallel connection of one or more battery cells disposed in a housing, the battery assembly further comprising a plurality of cell brackets, wherein each cell bracket comprises a first end connected to an internal base plate and a second end connected to an internal top plate, and wherein the battery assembly has an external skeleton, comprising the plurality of cell brackets, the internal base plate and the internal top plate and surrounding the one or more battery cells.

In this respect, a cell bracket is not a regular plate or panel as normally used to form a housing in the form of an enclosure. The cell brackets merely provide structural connections between the internal base plate and the internal top plate, thus together with the battery cells forming a firm and structurally strong battery assembly.

In an embodiment, each cell bracket comprises a resilient section in contact with at least one of the one or more battery cells. The resilient sections ensure an immovable arrangement of the one or more battery cells with respect to the internal base plate and internal top plate. In an advantageous embodiment, the resilient section is an arch shaped section, which snugly fits against one or more battery cells.

The internal base plate may comprise a plurality of base bracket slots, each base bracket slot being arranged for receiving a first end of the cell bracket, and the internal top plate may comprise a plurality of top bracket slots, each top bracket slot being arranged for receiving a second end of the cell bracket.

The base bracket slots and top bracket slots allow each cell bracket to fixedly connect the internal base plate to the internal top plate, the one or more battery cells being disposed there between. In an embodiment, the plurality of base bracket slots are disposed along a peripheral edge of the internal base plate, and the plurality of top bracket slots are disposed along a peripheral edge of the internal top plate.

These peripheral edges simplify the assembly of the battery as no cell bracket needs to be positioned between the one or more battery cells. That is, the plurality of cell brackets surround the one or more battery cells and therefore define the external skeleton.

The pace at which the battery can be assembled may be further increased by providing each cell bracket with snap fit connectors, thus the first end and second end of each cell bracket may be provided with a snap fit connector and wherein each base bracket slot and each top bracket slot is provided with a snap fit connector, which cooperates with the snap fit connector of a corresponding cell bracket. Such cooperating snap fit connecters allow for a fast and convenient automated assembly process, whereby the internal base plate can be connected to the plurality of cell brackets in a single movement.

In an advantageous embodiment, the first end of a cell bracket may comprise an abutment face for blocking the insertion of a snap fit connector into a corresponding base bracket slot beyond a particular insertion depth. The abutment face prevents further insertion of the first end into a corresponding base bracket slot when the internal top plate is pressed onto the second end of the cell bracket during the assembly process.

In an embodiment, the battery assembly further comprises a primary terminal assembly positioned atop (i.e. above) the internal top plate, wherein the primary terminal assembly is pre-assembled and comprises the primary positive battery terminal and the primary negative battery terminal. The primary terminal assembly may further comprise all electronics, various electrical connections, a fuse, a cooling assembly and the like. Since the primary terminal assembly comes pre-assembled with various electronic components, there is no need to assemble individual electronics so that the assembly process is simplified.

In an embodiment, the battery assembly comprises a housing which comprises two primary side panels fixedly attached to the internal base plate and the internal top plate, the housing further comprising two secondary side panels, a top panel, and a bottom panel disposed perpendicular to the two primary side panels. In a further embodiment, the battery assembly may comprise a single U-shaped housing part, combining the bottom panel and the two secondary side panels. Furthermore, the housing may comprise a composite sandwich material, such as a composite sandwich material having an interior of a polyethylene material and side walls of aluminum. This material allows e.g. the U-shaped housing part to be manufactured from a flat composite sandwich panel that is conveniently folded into the U-shaped housing part along appropriate grooves.

According to a further aspect, the present invention provides a method of assembling the battery assembly for reducing the complexity and cost of the assembly process, the method comprising placing one or more battery cells on an internal base plate, attaching a plurality of cell brackets to the internal base plate, placing an internal top plate on the one or more battery cells and attaching the plurality of cell brackets to the internal top plate, thereby forming an external skeleton for the one or more battery cells disposed there between, electrically connecting the one or more battery cells in series or parallel, mounting a primary terminal assembly on the internal top plate, the primary terminal assembly comprising a primary positive battery terminal and a primary negative battery terminal in electrical connection with the one or more battery cells, completing the housing of the battery assembly.

In an embodiment, attaching a plurality of cell brackets to the internal base plate comprises inserting a first end of each cell bracket into a base bracket slot of the internal base plate, wherein the first end of each cell bracket comprises a snap fit connector that facilitates a fast and simple attachment of the plurality of cell brackets to the internal base plate.

To ensure a correct parallel or series configuration of the one or more battery cells, the method may further comprise checking a correct polarity of the one or more battery cells disposed on the internal base plate before placing the internal top plate. Checking the polarity of the one ore more battery cells prior to placing the internal top plate may, for example, avoid accidental shorting of the one or more battery cells in a later stage of the assembly process.

In a further embodiment, attaching the plurality of cell brackets to the internal top plate comprises inserting a second end of each cell bracket into a top bracket slot of the internal top plate, wherein the second end of each cell bracket comprises a snap fit connector. With this step the external skeleton is completed and provides a structural rigid battery assembly to which remaining components can be attached and connected.

In yet a further embodiment, electrically connecting the one or more battery cells in series or parallel may comprise connecting at least two battery cells in series by means of one or more cell terminal connectors made of conducting material disposed in a secondary cell terminal apertures of the internal top plate. A secondary cell terminal aperture is arranged to expose one cell terminal of a first battery cell and one cell terminal of a second battery cell, so that the one or more cell terminal connectors are properly connected to the at least two battery cells.

In an advantageous embodiment, mounting the primary terminal assembly on the internal top plate comprises connecting the primary positive battery terminal to a positive cell terminal and connecting the primary negative battery terminal to a negative cell terminal of the one or more battery cells. In this step the various electronic components, fuses, wiring and the like need not be separately assembled as the primary terminal assembly comprises all pre-assembled electronics needed for the battery assembly.

In an embodiment, completing the housing of the battery assembly comprises providing a plurality of exterior panels. According to the invention, the external skeleton provides most of the structural rigidity of the battery assembly, whereas the plurality of exterior panels have little influence on the structural integrity.

In a further embodiment, providing a plurality of exterior panels comprises fixedly attaching two primary side panels to the internal base plate and the internal top plate, and placing two secondary side panels, a top panel, and a bottom panel perpendicular to the two primary side panels. Typically, the two primary side panels may be screwed or bolted onto the external skeleton, whereas the two secondary side panels, the top and bottom panel are loosely fitted into grooves of the two primary side, allowing cooling air to flow between an inside and outside of the housing.

In certain situations it may be advantageous to combine the two secondary side panels and bottom panel into a single piece of composite sandwich panel that comprises, for example, two metallic outer layers and a core layer there between. The metallic outer layers provide the housing with an increased heat resistance and structural integrity in hot environments.

In an embodiment, the method of the present invention may therefore comprise providing two folding grooves in a composite sandwich panel, folding the composite sandwich panel along the two grooves, attaching the resulting U-shaped folded composite sandwich panel to the battery assembly as the two secondary side panels and the bottom panel.

SHORT DESCRIPTION OF DRAWINGS

Figure 2:
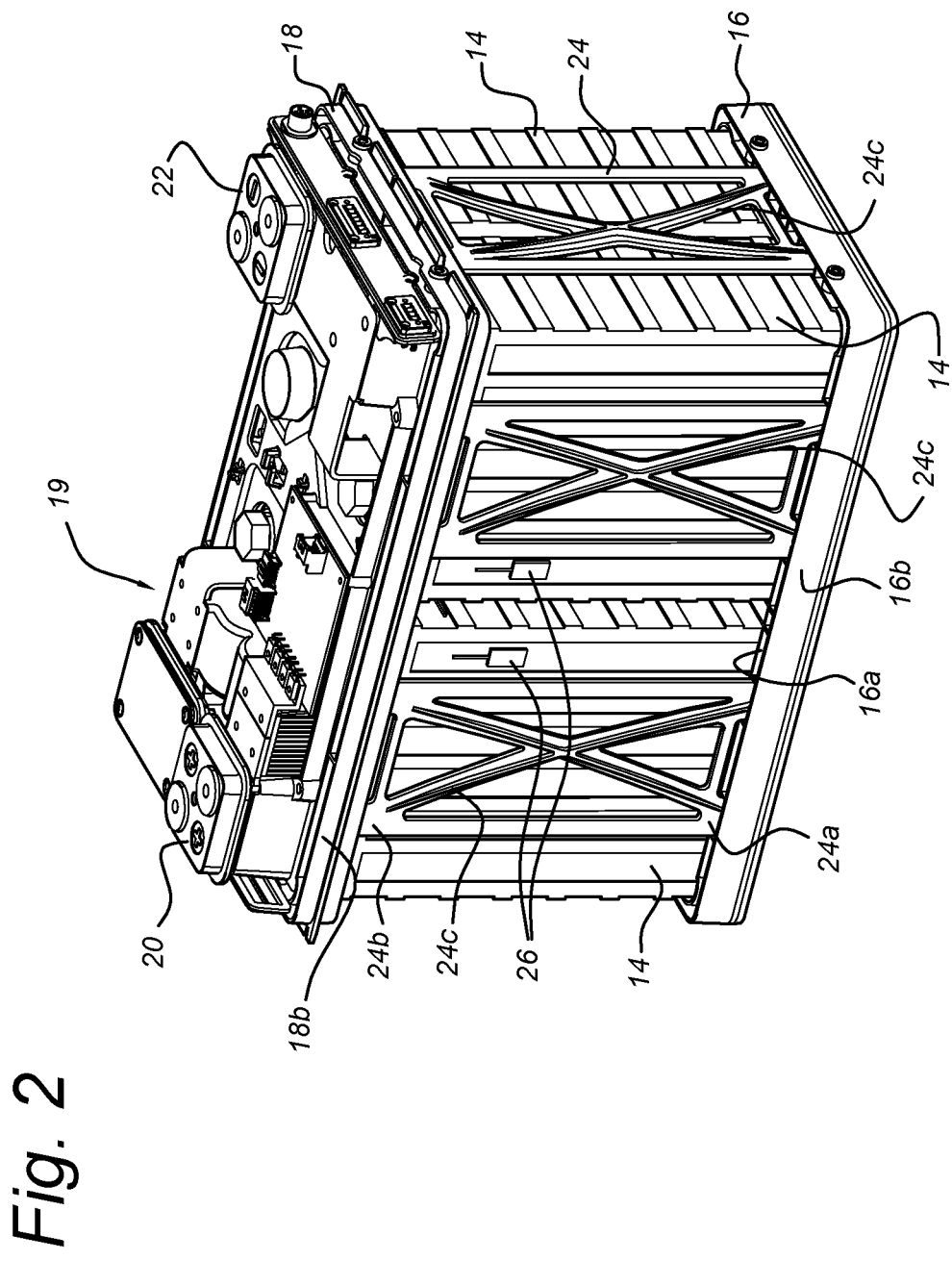
Figure 3:
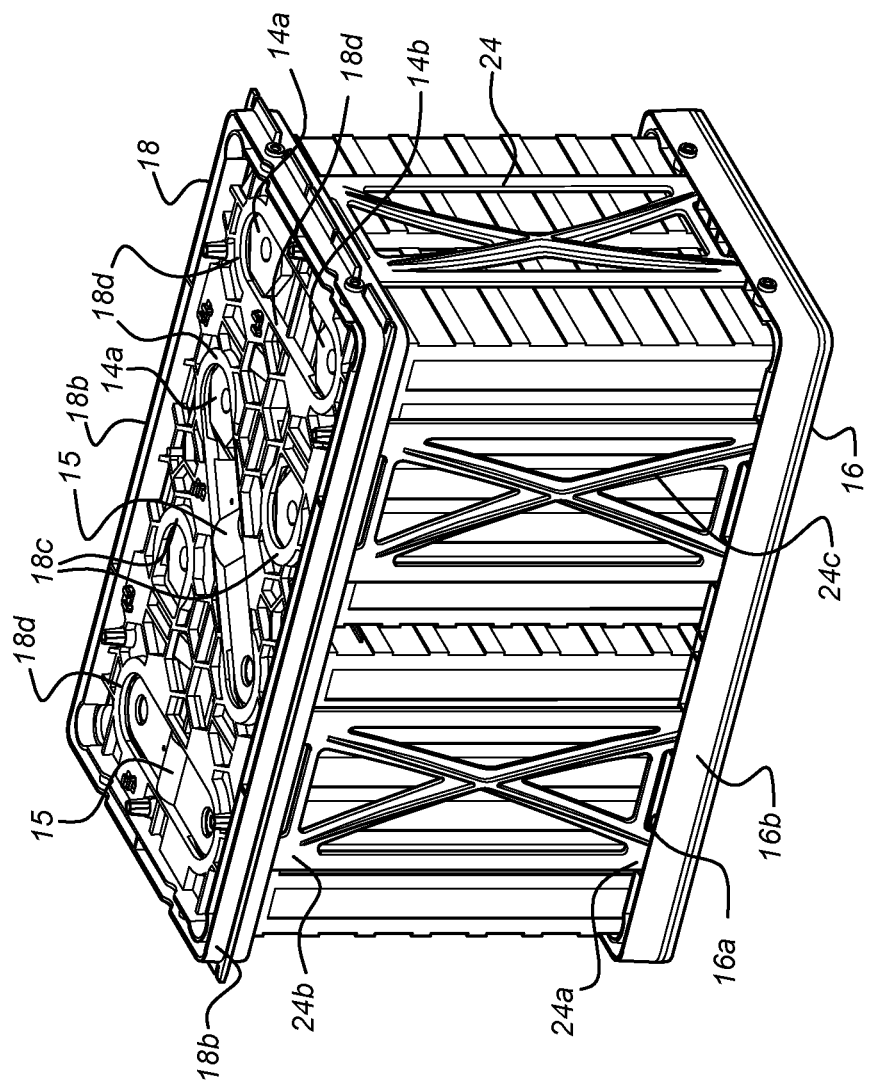
Figure 4:
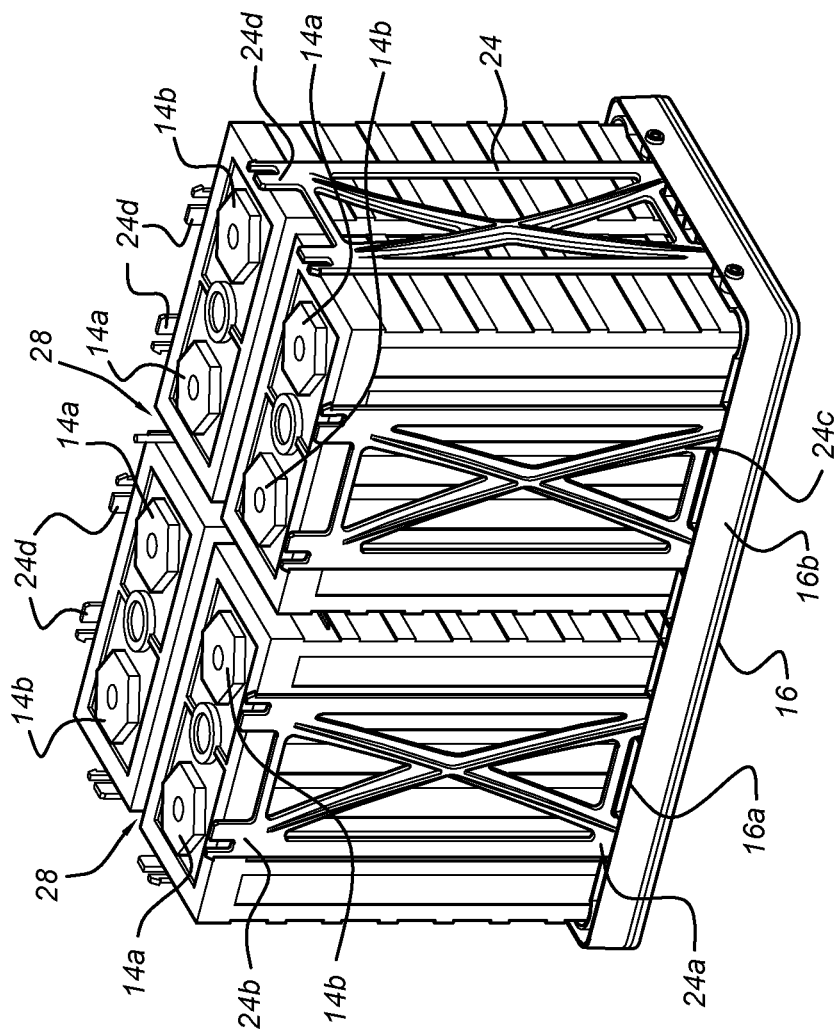
Figure 5:
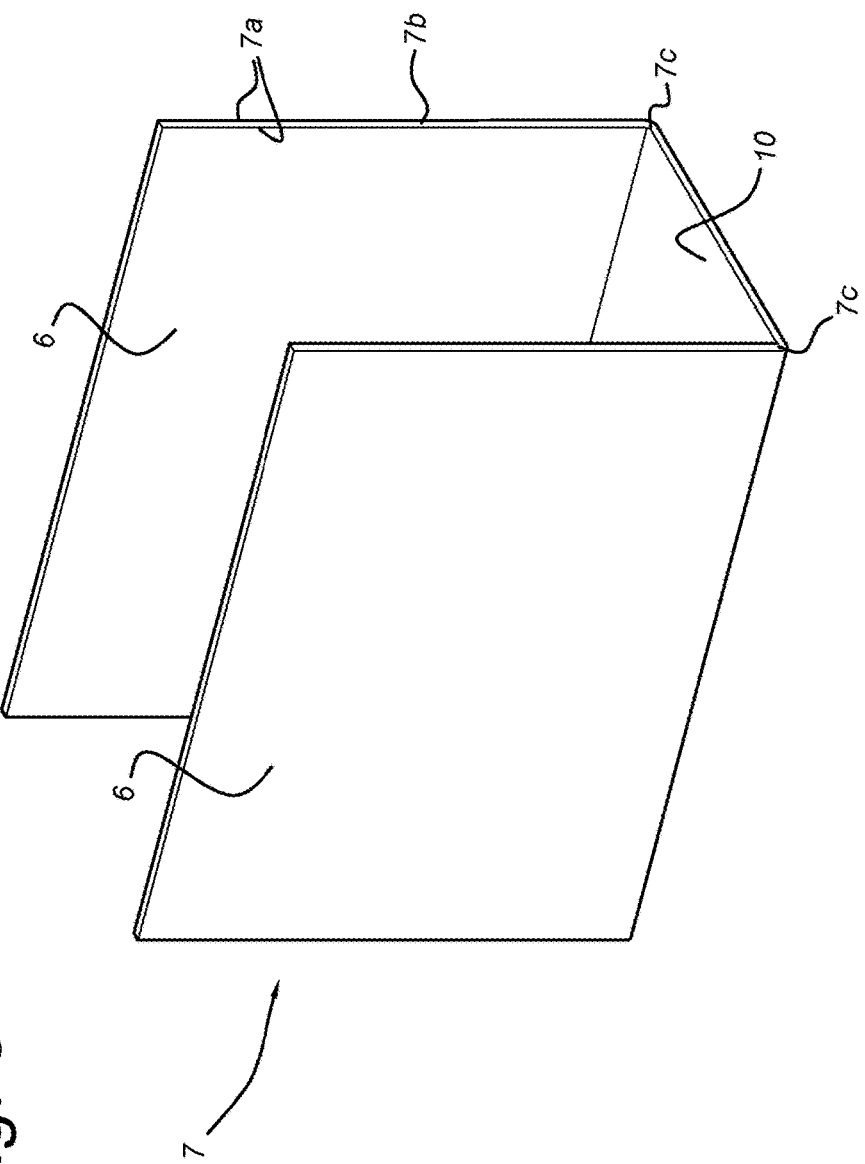

The present invention will be discussed in more detail hereinafter based on a number of exemplary embodiments with reference to the drawings, in which FIG. 1 shows a perspective view of an embodiment of a battery assembly according to the present invention;

FIG. 2-4 show perspective views of embodiments of a partial battery assembly according to the present invention; and FIG. 5 shows a perspective view of a further embodiment of part of the battery assembly according to the present invention.

DETAILED DESCRIPTION OF EXEMPLARY EMBODIMENTS

The present invention relates to a battery assembly comprising a minimum number of components for providing structural integrity and rigidity to the battery assembly.

Many prior art battery assemblies comprise a housing manufactured as a single piece housing, such as a single piece square or rectangular hollow container with an open side for inserting one or more battery cells in the container. However, a single piece housing or container is relatively difficult to handle and can be stored less efficiently. The battery assembly of the present invention on the other hand allows for a simple design and assembly process as the housing is assembled from substantially flat exterior panels that are easily attached to an internal structure of the battery assembly, wherein the internal structure provides the structural integrity and rigidity of the battery assembly. This is of particular relevance for modern day batteries, e.g. having lithium based battery cells. In the case of lithium based battery cells, handling of the complete battery assembly is important in order to guarantee safe operation during the entire operational life time.

FIG. 1 shows a perspective view of an embodiment of a battery assembly 1 according to the present invention, comprising a housing 2 with a primary positive battery terminal 20 and a primary negative battery terminal 22. Between the primary positive battery terminal 20 and primary negative terminal 22 an electrical circuit is provided comprising a series and/or parallel connection of one or more battery cells 14 disposed in the housing 2. In typical embodiments, the one or more battery cells 14 are lithium battery cells, comprising e.g. LiFePo, Lithium Iron Phosphate.

In the embodiment shown, the housing 2 comprises a plurality of exterior panels externally attached to a substantially rigid internal structure (not shown in FIG. 1) of the battery assembly 1. In an embodiment, the housing 2 may comprise two primary side panels 4 (or front and back panel) fixedly attached to an internal base plate 16 and the internal top plate 18. The housing 2 may further comprise two secondary side panels 6, a top panel 8, a bottom panel 10

(not visible in FIG. 1), all disposed perpendicular to the primary side panels 4. Furthermore, a plurality of corner profiles 12 may be disposed along edges of the housing 2, providing support for the exterior panels 4, 6, 8, 10.

Even though the exterior panels of the housing 2 provide some structural rigidity, the major structural rigidity of the battery assembly 1 is provided by the internal structure disposed in the housing 2. The precise description of the internal structure will become clear in the following paragraphs, referring to the FIGS. 2-4.

FIGS. 2, 3 and 4 show a perspective view of an embodiment of a partial battery assembly 1 according to the present invention in various stages of assembly, i.e. wherein the plurality of exterior panels 4, 6, 8, 10 have been removed, exposing various internal components of the battery assembly 1.

The battery assembly 1 comprises an internal base plate 16, an internal top plate 18 and one or more battery cells 14 disposed there between (shown most clearly in the view of FIG. 3). In the embodiment shown, four battery cells 14 are positioned side by side on the internal base plate 16. Rigidity may be provided to the internal base plate 16 by providing extending rims, e.g. in a honeycomb structure. This greatly enhances the torsional stability of the internal base plate 16. Also, the internal top plate 18 may be provided with appropriately positioned stiffening elements, e.g. in the form of rims.

FIG. 4 shows a perspective view of a partially assembled battery assembly 1 according to the present invention, wherein the internal top plate 18 has been removed. It is clearly seen that each battery cell 14 is provided with a plurality of cell terminals comprising a positive cell terminal 14a and a negative cell terminal 14b.

The one or more battery cells 14 are arranged on the internal base plate 16, wherein each battery cell 14 is received in a corresponding base plate recess for avoiding sliding movement of the battery cell 14 with respect to the internal base plate 16. One or more base plate recesses can be arranged for keeping sufficiently large air gaps 28 between the one or more battery cells 14, e.g. for cooling purposes. The internal temperature of the battery assembly 1 may be monitored by means of one or more thermal sensors disposed in the housing 2, such as the one ore more thermal sensors 26 attached to the one or more battery cells 14 shown in the FIG. 2 view.

The battery assembly 1 further comprises a plurality of cell brackets 24 fixedly connecting the internal base plate 16 and the internal top plate 18 to the one or more battery cells 14 disposed there between, thereby providing the internal structure of the battery assembly 1. More precisely, the internal structure mentioned in foregoing paragraphs is defined by the internal base plate 16, the internal top plate 18, the one or more battery cells 14 disposed there between, and the plurality of cell brackets 24 connected to the internal base plate 16 and the internal top plate 18.

In other words, the battery assembly 1 comprises a primary positive battery terminal 20 and a primary negative battery terminal 22 connected by an electrical circuit, the electrical circuit comprising a series or parallel connection of one or more battery cells 14. The battery assembly 1 further comprises an external skeleton formed by an internal base plate 16, an internal top plate 18 and a plurality of cell brackets 24, surrounding the one or more battery cells 14. The cell brackets 24, internal base plate 16 and top plate 18 (i.e. only three types of separate components), with the battery cells 14 in between, provide an external skeleton which acts as a rigid structure for the battery assembly. In this respect, a cell bracket is not a regular plate or panel as normally used to form a housing in the form of an enclosure. The cell brackets 24 are only forming structural connections between the internal base plate 16 and the internal top plate 18, thus together with the battery cells forming a firm and structurally strong battery assembly. E.g. the cell brackets 24 are formed by punching sheet metal. This structure is lightweight, yet very strong.

According to the present invention embodiments, the internal structure of the battery assembly 1 dispenses with a dedicated housing for providing structural integrity and rigidity to a battery assembly. Instead, the one or more battery cells 14 are fixedly arranged by means of the internal base plate 16, the internal top plate 18, and the plurality of cell brackets 24. The housing 2 (or battery assembly) is then completed by attaching the plurality of exterior panels 4, 6, 8, 10 to the internal structure.

In an advantageous embodiment, each cell bracket 24 comprises a resilient section 24c in contact with at least one of the one or more battery cells 14. The resilient section 24c is e.g. formed as an X-shaped part within a frame of the cell bracket 24, extending out of the plane of the frame. The resilient section 24c of a cell bracket 24 provides further structural rigidity to the battery assembly 1 by imposing a (biasing) lateral force on one or more battery cells 14. The force applied to each battery cell 14 prevents any possible sliding movement of said battery cell 14 with respect to the internal base plate 16 and internal top plate 18, and provides lateral support for the battery cells 14. In order to allow easy assembly, the base plate recesses of the internal base plate 16 for each battery cell 14 may have slightly larger dimensions than the bottom part of the battery cell 14. Any possible movement of the battery cells 14 can then be restrained by proper dimensioning of the cell brackets 24.

In a further embodiment, the resilient section 24c is an arc shaped section, wherein the arc shaped section provides both flexibility, which eases assembly, and pressure when assembled. The arc shaped section may comprise one or more protruding ridges for providing an adaptable flexibility of the resilient section 24c, the flexibility being determined by the dimensions (height, width) of the protruding ridges. Lateral forces imposed on the one or more battery cells 14 by the plurality of cell brackets 24 can therefore be adapted for different sizes of the battery assembly 1.

Furthermore, the cell brackets 24 may be provided with further resilient tabs, extending towards the outside of the battery assembly 1, for keeping the plurality of exterior panels 4, 6, 8, 10 of the housing 2 in position when assembled. The internal base plate 16 and internal top plate 18 can then be provided with loose fitting edges for accommodating the plurality of exterior panels 4, 6, 8, 10, as the further resilient tabs keep these pressed towards to outside of the housing 2.

In the view of FIG. 4 it is visible that each cell bracket 24 comprises a first end 24a connected to the internal base plate 16 and a second end 24b connected to the internal top plate 18. In an embodiment, the internal base plate 16 comprises a plurality of base bracket slots 16a, each base bracket slot 16a being arranged for receiving a first end 24a of the cell bracket 24, and the internal top plate 18 comprises a plurality of top bracket slots 18a, each top bracket slot 18a being arranged for receiving a second end 24b of the cell bracket 24. This provides for a very easy and efficient assembly and simple construction.

More specifically, the plurality of base bracket slots 16a are disposed along a peripheral edge 16b of the internal base plate 16, and the plurality of top bracket slots 18a are disposed along a peripheral edge 18*b* of the internal top plate 18, which results in that the skeleton is only formed on the outside of the battery cells 14. In other words, the plurality of cell brackets 24 are disposed along a base peripheral edge 16*b* and a top peripheral edge 18*b*, wherein each cell bracket 24 is connected to the base peripheral edge 16*b* at the first end 24*a* and connected to the top peripheral edge 18*b* at the second end 24*b*. The base and top peripheral edge 16*b*, 18*b* allow for easy placement of each cell bracket 24 as no cell bracket 24 is disposed between the one or more battery cells 14.

In an embodiment, one or more snap fit connectors 24*d* are disposed at the first end 24*a* and second end 24*b* of each cell bracket 24, as well as one or more corresponding snap fit connectors disposed in the base peripheral edge 16*b* and top peripheral edge 18*b*. The snap fit connectors are particularly advantageous for making a simple, fast yet strong connection of the cell brackets 24 to the internal base plate 16 and internal top plate 18.

In an advantageous embodiment, the first end 24*a* of a cell bracket 24 may be provided with an abutment face for blocking the insertion of a snap fit connector into a corresponding base bracket slot 16*a* beyond a particular insertion depth. The abutment face prevents further insertion of the first end 24*a* into a corresponding base bracket slot 16*a* e.g. when the internal top plate 18 is pressed onto the second end 24*b* of the cell bracket 24 during the assembly process.

The battery assembly 1 also comprises a primary terminal assembly 19 mounted on the internal top plate 18, as shown most clearly in the view of FIG. 2. Thus, the housing 2 of the battery assembly further comprises a primary terminal assembly 19, positioned atop the internal top plate 18. The primary terminal assembly 19 is pre-assembled and comprises the primary positive battery terminal 20 and the primary negative battery terminal 22, and additional electric circuit elements, such as electronic components, connections, fuse, cooling assembly.

FIG. 3 shows a perspective view of a partly assembled battery assembly 1 according to the present invention, wherein the primary terminal assembly 19 has been removed (or not yet positioned), thereby clearly showing the internal top plate 18. In the embodiment shown, the internal top plate 18 comprises a plurality of primary cell terminal apertures 18*c* and a plurality of secondary cell terminal apertures 18*d*. The plurality of primary and secondary cell terminal apertures 18*c*, 18*d* allow for a snug and tight mounting of the internal top plate 18 to the one or more battery cells 14, while still providing access to the terminals 14*a*, 14*b* of the one or more battery cells 14. Although not shown in the embodiments of FIGS. 1 to 4, the internal top plate 18 may comprise centering protrusions or tabs to ensure that the plurality of battery cells 14 are equally spaced apart, which is particularly advantageous when assembling the battery assembly 1. The centering protrusions or tabs may extend beyond the lower edge of the internal top plate 18, for ease of assembly of the battery assembly 1.

Each battery cell 14 is provided with a plurality of cell terminals comprising a positive cell terminal 14*a* and a negative cell terminal 14*b*. Each primary cell terminal aperture 18*c* aligns with one positive cell terminal 14*a* or one negative cell terminal 14*b*. Each secondary cell terminal aperture 18*d* aligns with one positive cell terminal 14*a* of a first battery cell 14 and one negative cell terminal 14*b* of a second battery cell 14, allowing for a series connection of said first and said second battery cell 14.

The battery assembly 1 further comprises one or more cell terminal connectors 15, wherein each cell terminal connector 15 is disposed in a corresponding secondary cell terminal aperture 18*d*. The one or more cell terminal connectors 15 connect the one or more battery cells 14 in series in the embodiment shown in FIG. 3. In an exemplary embodiment, the one or more cell terminal connectors 15 are made of a material exhibiting a low electrical resistance and a high thermal conductivity, such as copper. In a further embodiment, the one or more cell terminal connectors 15 may comprise tin plating for further enhancing the electrical conductivity. Cell terminal connectors 15 having a low electrical resistance reduce unwanted power losses and voltage drops between battery cells 14, and reduce (internal) heat generation.

It should be noted that the internal top plate 18 does not need one or more secondary cell terminal apertures 18*d* and corresponding cell terminals connectors 15 in case the batter assembly 1 comprises one single battery cell 14. In such a embodiment, the internal top plate 18 merely comprises a plurality of primary cell terminal apertures 18*c* exposing the positive and negative cell terminal 14*a*, 14*b* of the single battery cell 14.

In addition to providing structural rigidity to the battery assembly 1, the internal top plate 18 of the present invention avoids accidental shorting of the one or more battery cells 14 while assembling the battery assembly 1. As is clear from the view provided in FIG. 3 the internal top plate 18 prevents each cell terminal connector 15 from connecting a positive and a negative cell terminal 14*a*, 14*b* of the same battery cell 14. More precisely, the internal top plate 18 does not comprise a secondary cell terminal aperture 18*d* exposing a positive and a negative cell terminal 14*a*, 14*b* of the same battery cell 14. As a result, accidentally dropping a metallic tool such as a wrench on the internal top plate 18 while assembling the battery assembly 1 will not directly result in shorting one or more battery cells 14. The internal top plate 18 of the present invention therefore increases safety of the assembly process once it is placed on the one or more battery cells 14.

During assembly, the first end 24*a* of each cell bracket 24 is connected to the internal base plate 16, on which the battery cells 14 are positioned (the second end 24*b* of each cell bracket 24 being free). In a very simple manner, the assembly of the external skeleton can be completed by simply positioning the internal top plate 18 on top of this combination of elements. In an advantageous embodiment, the internal top plate 18 may comprise a plurality of resilient tabs which in assembled state of the battery assembly 1 are in contact with the one or more battery cells 14 (i.e. at the underside of the internal top plate 18. The resilient tabs impose a bias tension force on the plurality of cell brackets 24 once the internal top plate 18 is positioned into place. For example, pressing the internal top plate 18 onto the one or more battery cells 14 to complete the external skeleton may involve forces of up to 1000 N or more, hence the plurality of cell brackets 24 of the battery assembly 1 may experience a bias tension force up to 1000 N or more. The actual force exerted by the resilient tabs may be tuned, e.g. using ridges on surfaces of the resilient tabs.

According to a further aspect, the present invention relates to a method of assembling the battery assembly 1 for providing a fast and cost effective assembling procedure. Using the views of FIG. 4 to FIG. 1 in reverse order, the method of assembling a battery assembly 1 comprises placing one or more battery cells 14 on an internal base plate 16, attaching a plurality of cell brackets 24 to the internal base plate 16, placing an internal top plate 18 on the one or more battery cells 14 and attaching the plurality of cell brackets 24 to the internal top plate 18, thereby forming an external skeleton for the one or more battery cells 14 disposed there between. In a particular embodiment, this process is fully or partially automated, e.g. using a pressing arrangement to press the internal top plate 18 to the combination of internal base plate 16, one or more battery cells 14 and cell brackets 24. Furthermore, the method comprises electrically connecting the one or more battery cells 14 in series or parallel, mounting a primary terminal assembly 19 on the internal top plate 18, the primary terminal assembly 19 comprising a primary positive battery terminal 20 and a primary negative battery terminal 22 in electrical connection with the one or more battery cells 14, and completing the housing 2 of the battery assembly 1.

In an embodiment, attaching a plurality of cell brackets 24 to the internal base plate 16 comprises inserting a first end 24a of each cell bracket 24 into a base bracket slot 16a of the internal base plate 16, wherein the first end 24a of each cell bracket 24 comprises a snap-fit connector 24d.

The snap fit connecter simplifies the assembly process as no bolts, nuts, screws and the like are necessary. In a single movement each cell bracket 24 is attached to the internal base plate 16 and internal top plate 18, thereby greatly increasing the assembly speed.

In practice, the one or more battery cells 14 could be placed incorrectly on the internal base plate 16 by accident, which may lead to a wrong orientation of the battery cell terminals 14a, 14b. In order to avoid wrong cell terminal connections during the assembly process, the method may further comprise checking a correct polarity of the one or more battery cells 14 disposed on the internal base plate 16 before placing the internal top plate 18. In this way a correct orientation of battery cell terminals 14a, 14b is ensured.

In an embodiment, attaching the plurality of cell brackets 24 to the internal top plate 18 comprises inserting a second end 24b of each cell bracket 24 into a top bracket slot 18a of the internal top plate 18, wherein the second end 24b of each cell bracket 24 comprises a snap-fit connector. As mentioned earlier, the snap fit connecter simplifies the assembly process as no bolts, nuts, screws and the like are necessary. In a single movement each cell bracket 24 is attached to the internal top plate 18, thereby greatly increasing the assembly speed.

In case the battery assembly 1 comprises a plurality of battery cells 14, then electrically connecting the one or more battery cells 14 in series or parallel may comprise connecting at least two battery cells 14 in series by means of one or more cell terminal connectors 15 made of conducting material disposed in a secondary cell terminal apertures 18d of the internal top plate 18.

In advantageous embodiments, each cell terminal connector 15 is a substantially stiff, plate-like component. Typically, each cell terminal connector 15 is connected to a battery cell 14 by means of a threaded connection, e.g. bolts, in order to obtain an internal impedance of the battery package which is as low as possible.

In an embodiment, mounting the primary terminal assembly 19 on the internal top plate 18 comprises connecting the primary positive battery terminal 20 to a positive cell terminal 14a and connecting the primary negative battery terminal 22 to a negative cell terminal 14b of the one or more battery cells 14.

In this embodiment, the various electronic components of the battery assembly 1 are placed on the internal top plate 18 in a single movement as they are part of the (pre-assembled) primary terminal assembly 19. There is no need to separately install and place electrical components, such as controllers, circuit boards, various digital and analog communication ports, internal wiring and so forth. When placing the primary terminal assembly 19, only the primary positive and primary negative battery terminals 20, 22 need to be connected to corresponding cell terminals 14a, 14b.

In further embodiments, the remaining steps of the method involve completing the housing 2 of the battery assembly 1. For example, in an embodiment completing the housing 2 of the battery assembly 1 comprises providing a plurality of exterior panels 4, 6, 8, 10.

According to the invention, the need for a single-piece, hollow housing is not needed, thus minimizing handling complexity. That is, the housing 2 may be simply completed by externally attaching exterior panels, wherein each panel can be manufactured, stored, and handled efficiently.

In a further embodiment, providing a plurality of exterior panels 4, 6, 8, 10 comprises fixedly attaching two primary side panels 4 to the internal base plate 16 and the internal top plate 18, and placing two secondary side panels 6, a top panel 8, and a bottom panel 10 perpendicular to the two primary side panels 4.

In this embodiment, the primary side panels 4 may be placed at opposite sides of the battery assembly 1 (e.g. front and back side), wherein the secondary side panels 6, the top panel 8 and the bottom panel 10 are disposed there between. The primary side panels 4 may be screwed onto the internal base plate 16 and internal top plate 18. The remaining panels 6, 8, 10 may be disposed in receiving slots and/or grooves of the primary side panels 4 without using fasteners such as screws, bolts and the like, which would increase assembly complexity and would further increase the number of components. Note that the secondary side panels 6, the top panel 8 and bottom panel 10 may be loosely fitted into receiving grooves and/or slots of the primary side panels 4, allowing cooling air to flow between an inside and outside of the housing 2 of the battery assembly 1. Alternatively, ventilation openings may be provided, e.g. in the top part of the primary side panels 4.

Alternatively, a plurality of corner profiles 12 are provided (see embodiment of FIG. 1), which are provided with slots for mounting the remaining panels 6, 8 and 10. Afterwards, frames 4a may be provided covering the open ends of the corner profiles 12 and sides of the remaining panels 6, 8, 10 on the front and back side of the battery assembly.

In an alternative embodiment, the method may further comprise providing two folding grooves (e.g. v-shaped grooves) in a composite sandwich panel, folding the composite sandwich panel along the two grooves, attaching the resulting U-shaped folded composite sandwich panel to the battery assembly 1 as the two secondary side panels 6 and the bottom panel 10.

FIG. 5 shows a perspective view of an embodiment wherein the two secondary side panels 6 and the bottom panel 10 are formed as a single U-shaped piece 7 of folded composite panel, e.g. a sandwich panel. The composite panel comprises two aluminum (Al) outer layers 7a and a non-aluminum core 7b there between, e.g. a polymer core. The single U-shaped piece 7 comprises the two secondary side panels 6 and the bottom panel 10 and can be advantageously obtained by folding an aluminum composite panel 7 along straight v-shaped grooves 7c incised therein. The depth of each v-shaped groove 7c extends to an outer layer, i.e. one aluminum layer 7a of the composite panel is left intact and folded over an angle of substantially 90° degrees. In this way a single U-shaped piece 7 of composite panel is obtained capable of withstanding higher temperatures without losing structural integrity. In this embodiment, the single U-shaped piece or housing part 7 of composite sandwich material combines the bottom panel 10 and the two secondary side panels 6. The bottom and two side panels 6, 10 are then inseparable and form a single U-shaped folded piece 7 made of composite panel or sheet material. The housing 2 may then be completed by providing the top plate 8 in a similar manner as described above. Advantageously, the composite sandwich material comprises an interior of a polyethylene material and side walls of aluminum. This results in even less weight than complete metal panels, and still provides a heat resistant housing 2. Even in the case of a locally high temperature inside the battery package, the integrity of the housing 2 is ensured.

In further embodiments, each exterior panel 4, 6, 8, 10 is made of a metal or a metal alloy, which would be capable of withstanding higher temperatures without losing structural integrity. Alternatively each exterior panel 4, 6, 8, 10 is made of a plastic material to keep the manufacturing process simple and cost effective. For example, injection molding or an extrusion process can be used to manufacture each plastic exterior panel.

The present invention embodiments have been described above with reference to a number of exemplary embodiments as shown in the drawings. Modifications and alternative implementations of some parts or elements are possible, and are included in the scope of protection as defined in the appended claims.

The invention claimed is:

1. A battery assembly, comprising:
   a primary positive battery terminal and a primary negative battery terminal connected by an electrical circuit, the electrical circuit comprising a series or parallel connection of one or more battery cells; and
   four sides and an external skeleton formed by an internal base plate, an internal top plate and a plurality of cell brackets, surrounding the one or more battery cells around all of the four sides of the battery assembly,
   wherein each cell bracket comprises a resilient section in contact with at least one of the one or more battery cells, and
   wherein the resilient section is an X-shaped part within a frame of the cell bracket extending out of a plane of the frame, the X-shaped part being in lateral biasing engagement with the one or more battery cells.

2. The battery assembly according to claim 1,
   wherein the internal base plate comprises a plurality of base bracket slots, each base bracket slot being arranged for receiving a first end of the cell bracket, and
   wherein the internal top plate comprises a plurality of top bracket slots, each top bracket slot being arranged for receiving a second end of the cell bracket.

3. The battery assembly according to claim 2,
   wherein the plurality of base bracket slots are disposed along a peripheral edge of the internal base plate, and
   wherein the plurality of top bracket slots are disposed along a peripheral edge of the internal top plate.

4. The battery assembly according to claim 1, wherein a first end and a second end of each cell bracket are provided with a snap fit connector and wherein each base bracket slot and each top bracket slot is provided with a snap fit connector.

5. The battery assembly according to claim 1, further comprising:
   a primary terminal assembly, positioned atop the internal top plate,
   wherein the primary terminal assembly is pre-assembled and comprises the primary positive battery terminal and the primary negative battery terminal.

6. The battery assembly according to claim 1, further comprising:
   a housing having two primary side panels fixedly attached to the internal base plate and the internal top plate,
   the housing also having two secondary side panels, a top panel, and a bottom panel disposed perpendicular to the two primary side panels.

7. The battery assembly according to claim 6, further comprising:
   a single U-shaped housing part, combining the bottom panel and the two secondary side panels.

8. The battery assembly according to claim 6, wherein the housing comprises a composite sandwich material having an interior of a polyethylene material and side walls of aluminum.

9. A method of manufacturing a battery assembly according to claim 1, comprising:
   placing one or more battery cells on an internal base plate;
   attaching a plurality of cell brackets to the internal base plate around four sides of the battery assembly, wherein each cell bracket comprises a resilient section in contact with at least one of the one or more battery cells, and wherein the resilient section is an X-shaped part within a frame of the cell bracket extending out of a plane of the frame, the X-shaped part being in lateral biasing engagement with the one or more battery cells;
   placing an internal top plate on the one or more battery cells;
   attaching the plurality of cell brackets to the internal top plate, thereby forming an external skeleton for the one or more battery cells disposed there between;
   electrically connecting the one or more battery cells in series or parallel;
   mounting a primary terminal assembly on the internal top plate, the primary terminal assembly comprising a primary positive battery terminal and a primary negative battery terminal in electrical connection with the one or more battery cells; and
   completing the housing of the battery assembly.

10. The method according to claim 9, wherein attaching a plurality of cell brackets to the internal base plate comprises inserting a first end of each cell bracket into a base bracket slot of the internal base plate 16, wherein the first end of each cell bracket comprises a snap-fit connector.

11. The method according to claim 9, further comprising:
    checking a correct polarity of the one or more battery cells disposed on the internal base plate before placing the internal top plate.

12. The method according to claim 9, wherein attaching the plurality of cell brackets to the internal top plate comprises inserting a second end of each cell bracket into a top bracket slot of the internal top plate, wherein the second end of each cell bracket comprises a snap-fit connector.

13. The method according to claim 11, wherein electrically connecting the one or more battery cells in series or parallel comprises connecting at least two battery cells in series by means of one or more cell terminal connectors made of conducting material disposed in a secondary cell terminal apertures of the internal top plate.

14. The method according to claim 10, wherein mounting the primary terminal assembly on the internal top plate comprises connecting the primary positive battery terminal to a positive cell terminal and connecting the primary negative battery terminal to a negative cell terminal of the one or more battery cells.

15. The method according to claim 9, wherein completing the housing of the battery assembly comprises providing a plurality of exterior panels.

16. The method according to claim 15, wherein providing a plurality of exterior panels comprises fixedly attaching two primary side panels to the internal base plate and the internal top plate, and placing two secondary side panels, a top panel, and a bottom panel perpendicular to the two primary side panels.

17. The method according to claim 16, further comprising:
   providing two folding grooves in a composite sandwich panel, folding the composite sandwich panel along the two grooves, attaching the resulting U-shaped folded composite sandwich panel to the battery assembly as the two secondary side panels and the bottom panel.

* * * * *